United States Patent
Motose et al.

[11] Patent Number: 6,065,445
[45] Date of Patent: May 23, 2000

[54] ENGINE FEEDBACK CONTROL

[75] Inventors: Hitoshi Motose; Masahiko Kato, both of Hamamatsu, Japan

[73] Assignee: Sanshin Kogyo Kabushiki Kaisha, Hamamatsu, Japan

[21] Appl. No.: 09/210,183

[22] Filed: Dec. 11, 1998

[30] Foreign Application Priority Data

Dec. 16, 1997 [JP] Japan ................................ 9-346340

[51] Int. Cl.[7] .......................... F02M 39/00; F02D 41/00
[52] U.S. Cl. ......................... 123/305; 123/672; 123/679
[58] Field of Search ................................ 123/305, 73 C, 123/672, 478, 479, 679, 703, 480, 689

[56] References Cited

U.S. PATENT DOCUMENTS

| | | | |
|---|---|---|---|
| 5,579,745 | 12/1996 | Katoh et al. | 123/679 |
| 5,694,909 | 12/1997 | Kato | 123/672 |
| 5,697,353 | 12/1997 | Katoh et al. | 123/679 |
| 5,727,536 | 3/1998 | Kato | 123/682 |
| 5,832,907 | 11/1998 | Kato | 123/672 |
| 5,927,247 | 7/1999 | Tanaka | 123/672 |
| 5,941,223 | 8/1999 | Kato | 123/679 |
| 5,979,400 | 11/1999 | Nishide | 123/305 |
| 5,983,878 | 11/1999 | Nonaka et al. | 123/687 |

*Primary Examiner*—Willis R. Wolfe
*Assistant Examiner*—Hieu T. Vo
*Attorney, Agent, or Firm*—Knobbe, Martens, Olson & Bear LLP

[57] ABSTRACT

A feed back control system and method for direct injected engines, particularly useful in marine applications to avoid excessive hunting due to the close proximity of the sensor to the fuel injector. Both injection initiation and duration are controlled. Under certain conditions such as lean burn, steady state and transition from rich to lean the control is initially of only one of these two factors. If the air fuel ratio is then still out of range, the other control is effected.

38 Claims, 9 Drawing Sheets

ENGINE FEEDBACK CONTROL

BACKGROUND OF THE INVENTION

This invention relates to an engine feedback control and more particularly to an improved engine feedback control for a direct injected, internal combustion engine.

In spite of the advantages of two cycle engines over four cycle engines in regard to complexity and high specific output, the environmental concerns are causing reappraisal of the continued use of two cycle engines. Specifically, the overlap between the scavenge port and exhaust port opening and closing gives rise to the possibility that unburned hydrocarbons may pass into the atmosphere through the exhaust port.

It has been thought that the performance of these engines can be improved by utilizing such methodologies as feedback control and/or direct cylinder fuel injection in order to improve their performance and make their continued use more feasible.

With feedback control systems, an engine combustion condition sensor such as an oxygen sensor is positioned in proximity to the combustion chamber or the exhaust system so as to sense the oxygen content of the exhaust gases at the completion of the burning cycle. By determining the amount of oxygen present, it is possible to tell if the engine is running rich or lean. Then, feedback control is possible to maintain the desired fuel/air ratio and, accordingly, improve the exhaust emission control.

Direct cylinder injection also is useful in improving engine performance. With direct cylinder injection, the amount of fuel injected per cycle can be more accurately controlled and this is particularly important with two cycle engines.

However, when two-cycle engines employ fuel injection and the fuel is injected directly into the combustion chamber, the risk of having the fuel pass out of the exhaust port is substantially increased. Therefore, there has been proposed in our copending application entitled "Control for Direct Injected Two-Cycle Engine," Ser. No. 09/188,953, filed Nov. 10, 1998, and assigned to the Assignee hereof, an injection system wherein the timing of fuel injection is controlled so as to be more advanced from the prior art methods so that it occurs before the exhaust port has been totally closed.

The injection timing is initiated, however, at a time so that the first injected fuel will not reach the exhaust port before it closes. This system provides a significantly improved engine performance and emission control.

However, when coupled with feedback controlled, two cycle, direct cylinder injection presents some problems. The reason is that the fuel injector is inherently positioned in closer proximity to the combustion chamber condition sensor than with other types of engines. Thus, the close proximity of the combustion condition sensor in the fuel injector can cause very sensitive fluctuations in the sensor output and unless the control is more accurate, then wide fluctuations in air/fuel ratio and uneven and unsatisfactory running conditions can occur. These problems also exist in four cycle engines.

It is, therefore, a principal object of this invention to provide an improved control strategy for direct injected, feedback controlled, internal combustion engines wherein the fuel injector and the combustion condition sensor are in close proximity to each other.

The problems aforenoted are even more significant in connection with marine application. Because of their high specific outputs and relatively simple construction, two cycle engines are widely utilized in ring propulsion arrangements. However, in connection with such applications it is the normal practice to discharge the exhaust gases to the atmosphere through the body of water in which the watercraft is operating, at least under high speed conditions. In this way, the exhaust gases can be adequately silenced by utilizing the body of water. This is particularly important, due to the extreme compact nature of marine exhaust systems.

However, the discharge of the exhaust gases beneath the level of water gives rise to another problem which aggravates the feedback control. This is that the back pressure can vary rather significantly as the water level changes. This can effect the ability of the exhaust gases to be discharged and can further complicate the accuracy of the feedback control. This is also aggravated by the close proximity of the exhaust condition sensor and the fuel injector.

It is, therefore, a still further object of this invention to provide an improved feedback control system for a marine propulsion engine having direct cylinder injection.

SUMMARY OF THE INVENTION

This invention is adapted to be embodied in a direct cylinder injected internal combustion engine comprised of an engine body defining at least one cylinder bore in which a piston reciprocates. A cylinder head is affixed to one end of the engine body for closing the cylinder bore and defining with the piston and the cylinder bore a combustion chamber. At least one intake port admits an air charge to the combustion chamber. At least one exhaust port discharges burned combustion products from the combustion chamber. A fuel injector sprays fuel directly into the combustion chamber for combustion therein. A combustion condition sensor is provided in proximity to the fuel injector for determining the air/fuel ratio in the combustion chamber. A feedback control system controls the initiation of fuel injection and the duration of fuel injection based upon the output from the combustion condition sensor to maintain the desired fuel/air ratio. When the engine is running in a lean burn mode, the control of the fuel/air ratio is achieved primarily by adjusting the timing of beginning of fuel injection in order to maintain the desired fuel/air ratio.

DETAILED DESCRIPTION OF THE PREFERRED EMBODIMENTS OF THE INVENTION

Figure 1:
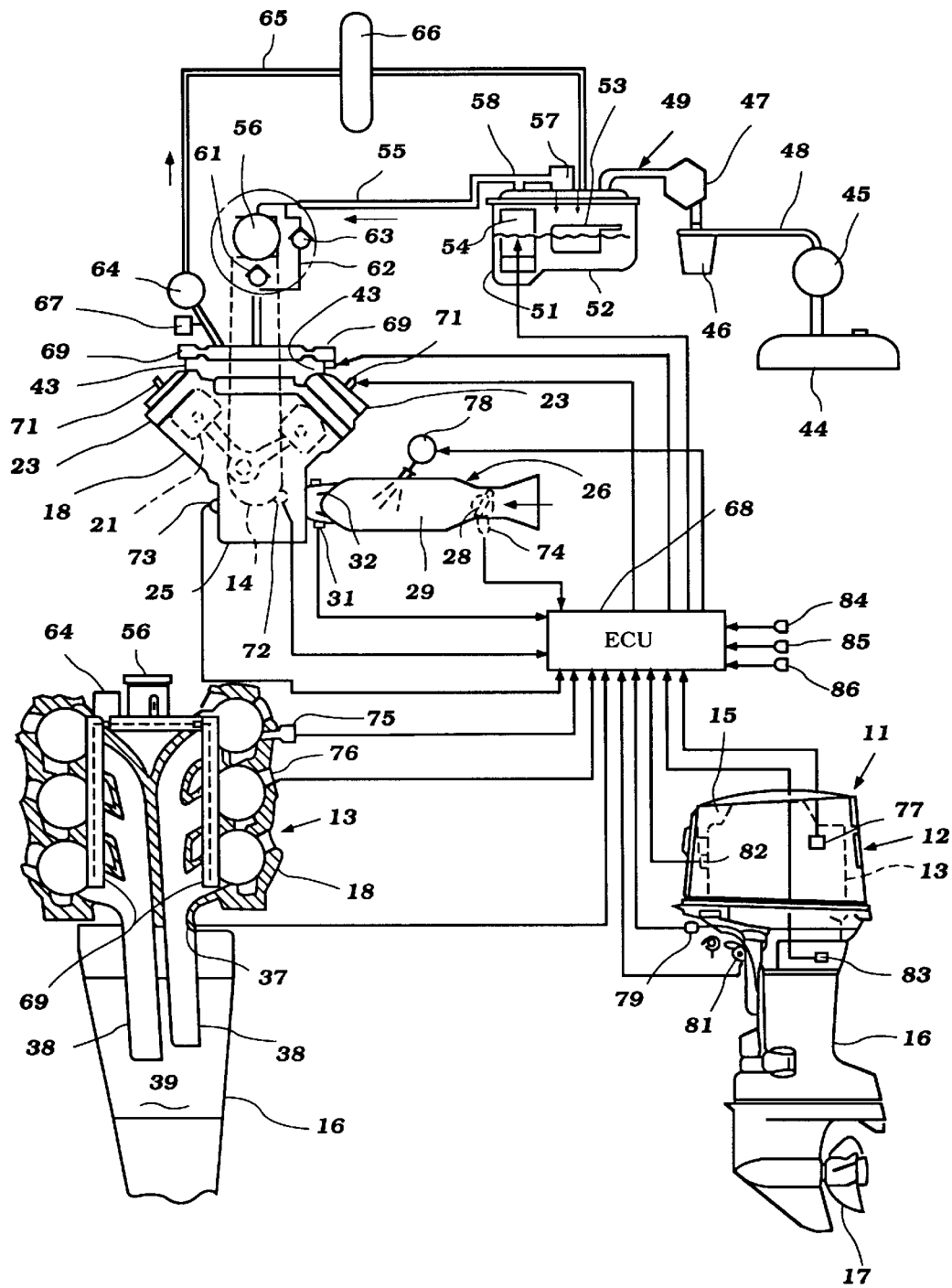
FIG. 1 is a partially schematic view having three portions that are connected by the controlling ECU of the engine. The lower right hand portion of this view shows a side elevational view of an outboard motor, the lower left hand side shows a rear elevational view of the outboard motor on an enlarged scale and a partial cross-section of the engine taken through the cylinders and exhaust manifold and the upper portion shows a top plan view of the engine and the fuel supply system with portions shown schematically.

Referring initially primarily to FIG. 1, the lower right hand portion of this view illustrates a side elevational of an outboard motor that is constructed and operated in accordance with the invention. The outboard motor is indicated generally by the reference numeral 11 and except as will hereinafter be noted maybe considered to be of a generally conventional construction.

Figure 13:
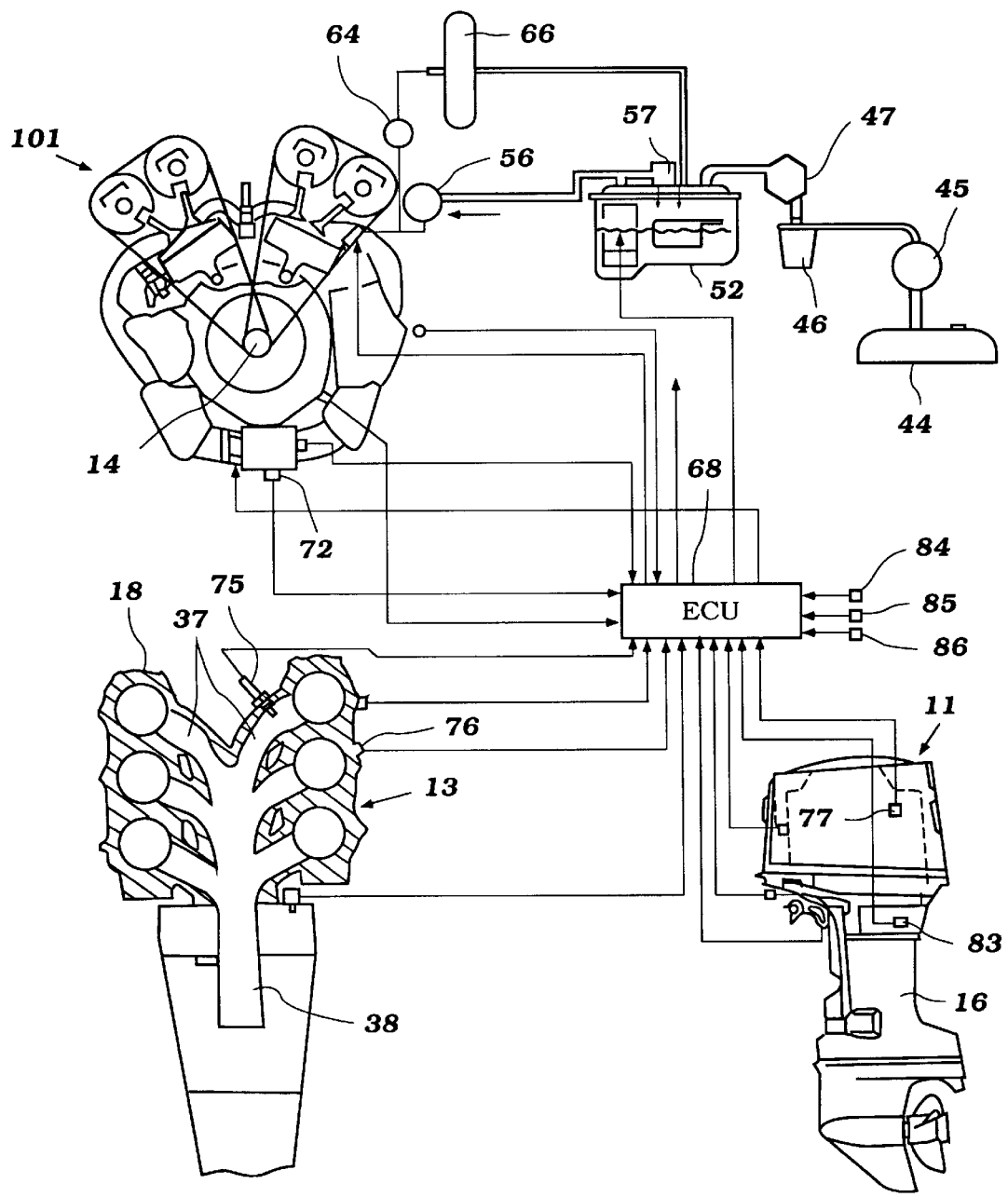
FIG. 13 is a view in part similar to FIG. 1 having the same three-part views but showing how the invention can be employed in conjunction with a four-cycle engine.

The outboard motor 11 is comprised of a power head 12 that contains a powering internal combustion engine 13. As best seen in the other two portions of this figure, the engine 13 is, in this embodiment, of the V6 type and operates on a two stroke crankcase compression principal. Although the number of cylinders and cylinder orientation can be varied, the invention has particularly utility in connection with two cycle engines and particularly those having multiple cylinders but certain of the control strategy also is applicable to four cycle engines. Such an embodiment is shown in FIG. 13.

As is typical with outboard motor practice, the engine 13 is supported in the power head 12 so that its crankshaft 14 rotates about a vertically extending axis for a reason which will be described momentarily.

The power head 12 is completed by a protective cowling 15 which surrounds and protects the engine 13. This protective cowling 15 is formed with an air inlet opening so that induction air for operation for the engine 13 can be drawn from the surrounding atmosphere.

The engine 13 and specifically its crankshaft 14 is coupled to a driveshaft (not shown) that depends into and is journaled within a driveshaft housing lower unit assembly 16. This is the reason for the vertical orientation of the axis of rotation of the crankshaft 14. This driveshaft depends into the lower unit where it drives a propulsion device for an associated watercraft through a suitable transmission. In the illustrated embodiment, the propulsion device comprises a propeller 17 which is selectively driven in forward and reversed directions through a bevel gear reversing transmission of the type well known in this art The outboard motor 11 also includes clamping and swivel brackets or another arrangement for mounting it to the transom of an associated watercraft. Since these types of constructions are well known in the art, further description of them is not believed to be necessary to permit those skilled in the art to practice the invention. The mounting arrangement is such, however, that the height and trim angle of the propeller 17 may be adjusted, even during running. This is significant in the engine control, as will become apparent.

Figure 2:
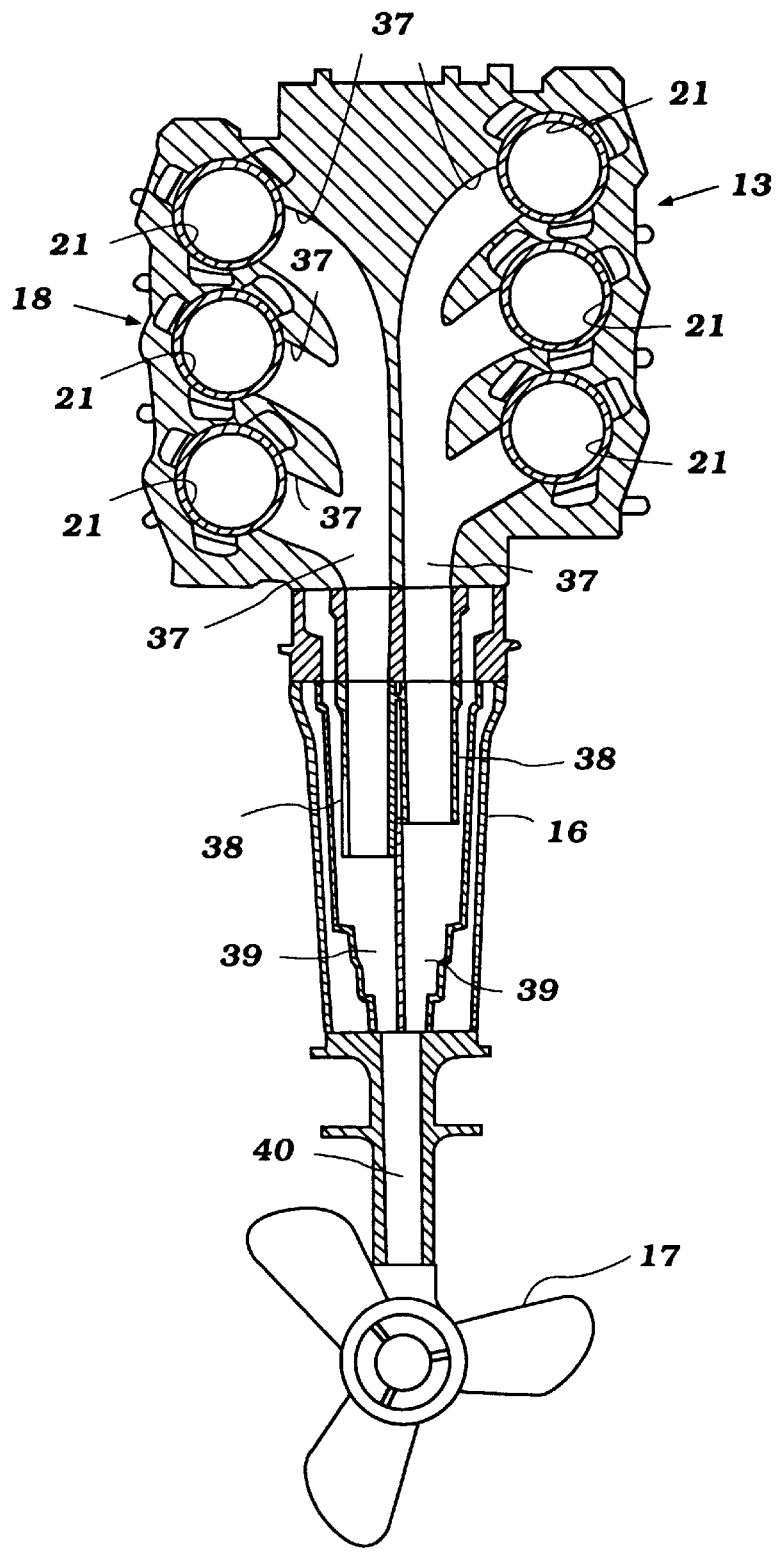
FIG. 2 is an enlarged and more complete view of the outboard motor as shown in the lower left hand view of FIG. 1.

Referring now primarily to the lower left hand view and the upper view of FIG. 1 and additionally to FIG. 2, the engine 13 includes a cylinder block, indicated generally by the reference numeral 18. Because of the V-type configuration employed in this embodiment, the cylinder block 18 is formed with two cylinder banks each of which has three vertically spaced cylinder bores 19. Pistons 21 are slidably supported in the cylinder bores 19. The pistons 21 are connected by means of connecting rods 22 to the throws of the crankshaft 14 for driving it in a known manner.

Cylinder head assemblies, indicated generally by the reference numeral 23 are affixed to the banks of the cylinder block 18 and close the cylinder bores 21. These cylinder head assemblies 22, the cylinder bores 19 and the pistons 21 form the combustion chambers of the engine 13.

The crankshaft 14 rotates in a crankcase chamber defined by the cylinder block 18 and a crankcase member 24 that is affixed thereto. As is typical with two cycle crankcase compression engines, the portions of the crankcase chamber, indicated schematically at 25, associated with each of the cylinder bores 19 are sealed from each other.

An air charge is delivered to these individual crankcase chamber sections 25 by an air induction system which appears also in the upper portion of FIG. 1 and which is indicated generally by the reference numeral 26. This induction system 26 includes an air inlet device 27 that may include a silencing arrangement and which draws air from within the protective cowling 15 that has been admitted through the aforenoted inlet opening.

A throttle valve 28 is provided in throttle bodies that communicate with the intake device 27 and deliver it to intake manifold runners 29 of an intake manifold assembly. The throttle valves 28 are controlled in any suitable manner to satisfy the operator demand. The intake manifold runners 29 communicate with intake ports 31 formed in the crankcase member 24 and each associated with a respective cylinder bore 19.

Reed type check valves 32 are provided in the manifold runners 29 adjacent the intake ports 31. These reed type check valves permit an air charge to be drawn into the crankcase chambers when the respective pistons 21 are moving upwardly in their cylinder bores 19. As the pistons 21 move downwardly, the charge in the crankcase chambers 25 will be compressed and the respective reed type check valve 32 will close to preclude reverse flow.

Figure 3:
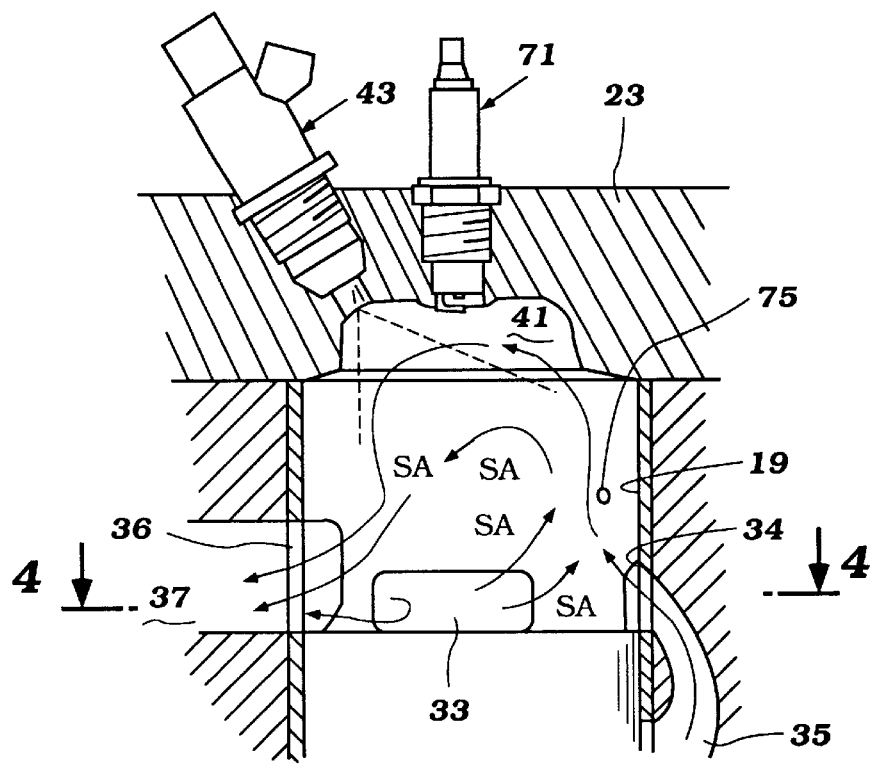
FIG. 3 is an enlarged cross-sectional view taken through a single cylinder of the engine and depicts part of the theory by which the control strategy operates.
Figure 4:
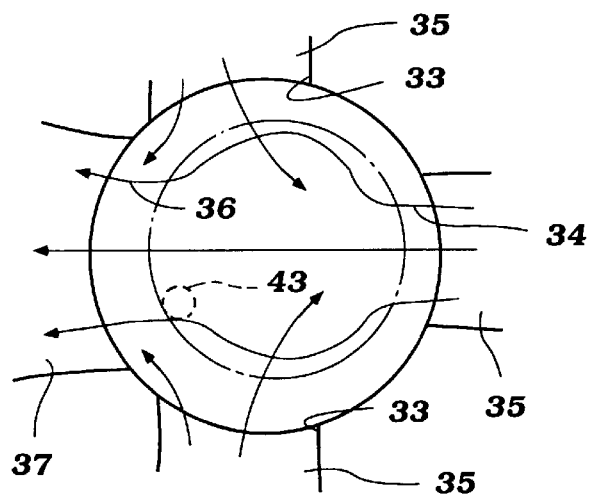
FIG. 4 is a cross-sectional view taken along the line 4—4 in FIG. 3 to further show the scavenging air flow pattern and the path of injected fuel.

Referring now additionally to FIGS. 3 and 4, it will be seen that each cylinder bore is provided with a scavenging system. In the illustrated embodiment, the scavenging system is of the Schnurl type and includes a pair of side, main scavenge ports 33 and a center, auxiliary scavenge port 34. Scavenge passages 35 communicate the crankcase chambers 25 with each of the scavenge ports 34 and 35. As is well known in two cycle practice, the scavenge ports 33 and 34 are opened and closed by the reciprocation of the pistons 21 in the cylinder bores 19.

It should be noted that the main scavenge ports 33 are disposed on opposite sides of an exhaust port 36 which is diametrically opposite the auxiliary scavenge port 34. As may be best seen in the lower left hand portion of FIG. 1 and in FIG. 2, the exhaust ports 36 communicate with exhaust manifolds 37 that are formed integrally within the cylinder block 18. Basically, there is an exhaust manifold 37 for each bank of cylinders.

These exhaust manifolds 37 terminate in exhaust pipes 38 that depend into a pair of expansion chambers 39 formed in the driveshaft housing and lower unit 16. These expansion chambers 39 communicate with a suitable high speed underwater exhaust gas discharge and a low speed, above the water exhaust gas discharge of any known type.

The underwater exhaust gas discharge is shown primarily in FIG. 2 and includes a conduit 40 that depends through the lower unit portion of the drive shaft housing lower unit and which communicates through the hub underwater discharge formed in the propeller 17.

As has been previously noted, the trim and height of the propeller 17 can be adjusted and this adjustment will change the depth of submersion of the underwater discharge during engine running. In addition, various water conditions may also cause this height to vary during engine running. Thus, the back pressure on the exhaust system will be variable and this back pressure is particularly significant in effecting the rate of air flow in scavenging the combustion chambers of the engine. Thus, a condition is present with marine applications that is not existent normally in automotive applications and which can seriously effect the feedback control, as will be described shortly.

As the pistons 21 move downwardly in their cylinder bores 19 toward the bottom dead center position shown in FIG. 3, the charge compressed in the crankcase chambers 25 will be compressed and eventually transfer to the respective engine combustion chamber, indicated generally by the reference numeral 41 through the scavenge passages 35 and scavenge ports 33 and 34 when they are opened by the movement of the piston 21. The flow of scavenging air is shown in FIGS. 3 and 4 by the arrows SA.

In accordance with an important feature of the invention, the engine 13 is provided with a direct cylinder fuel injection system. This fuel injection system is shown in part schematically in the upper portion of FIG. 1 and will now be described by particular reference to that figure. Before referring thereto, however, it should be noted that fuel injectors 42 are mounted in the cylinder head assembly 23 so as to spray fuel from this fuel supply system directly into the combustion chambers 41. The location and functioning of these fuel injectors 43 will be described after the system which supplies fuel to them has been described.

As is typical with outboard motor practice, the outboard motor 11 is supplied with fuel from a main fuel tank 44 which is normally mounted within the hull of the associated watercraft. Fuel is supplied form this tank 44 by a first low pressure pump 45 to a fuel filter 46 that is mounted within the protective cowling 12. The connection from the fuel tank 44 to the filter 46 includes a conduit 47 having a quick disconnect coupling of a known type.

A second, engine driven low pressure fuel pump 47 in the power head 12 collects the fuel from the fuel filter 46 and delivers it to a vapor separator, indicated generally by the reference numeral 49. The low pressure fuel pumps 48 may be of the type that are operated by crankcase pressure variations as is well known in this art The vapor separator 49 includes an outer housing 51 that is mounted at a suitable location within the protective cowling 15. A level of fuel, indicated at 52 is maintained in this housing 51 by a valve operated by a float 53.

Contained within the housing 51 is an electrically driven pressure pump 54 which develops a higher pressure than the pump 47 but a pressure that is not really high enough for effective high pressure direct cylinder injection.

This fuel is discharged from the vapor separator housing 51 through a supply conduit 55 to a high pressure, engine driven, positive displacement pump 56. The pump 56 may be of any known type and preferably has one or more plungers operated by cams for delivering extremely high pressures at a positive displacement. The pressure at which fuel is delivered to the high pressure pump 56 is regulated by a low pressure regulator 57 in a return line 58 that communicates the pressure line 55 back with the interior of the vapor separator body 51.

The high pressure pump 56 delivers fuel under pressure to a main fuel manifold 59 through a conduit in which a check valve 61 is positioned. A parallel conduit 62 extends around the high pressure pump 56 to the main fuel manifold. A check valve 63 is provided in this bypass line so that when the high pressure pump 56 is generating high pressure fluid, no flow will occur through the line 62.

A high pressure regulator 64 is provided in the main fuel manifold 59 and limits the maximum pressure of the fuel supply to the fuel injectors 43. This is done by dumping fuel back to the vapor separator assembly 49 through a return line 65. A fuel heat exchanger or cooler 66 may be provided in this return line 65 so as to ensure that the fuel is not at too high a temperature.

A pressure sensing device 67 is provided also in the main fuel manifold 59 for providing a fuel pressure signal to an ECU, indicated at 68 in FIG. 1 for controlling the engine systems, as will be described.

The main fuel manifold 59 supplies fuel to a pair of fuel rails 69 each of which is associated with a respective one of the cylinder banks. The fuel rails 69 each supply fuel in a known manner to the fuel injectors 43 of the respective cylinder banks.

As seen in FIGS. 3 and 4, the fuel injectors 43 are mounted in the cylinder head assemblies 23, in the illustrated embodiment, over the exhaust ports 36 on the exhaust side of the engine. These injectors spray downwardly toward the heads of the pistons 21. The fuel injectors 43 are preferably of the solenoid operated type and have a solenoid valve which, when opened, controls the discharge of fuel into the combustion chambers as shown in broken lines in FIG. 3 so as to provide a fuel patch in the combustion chamber, the size of which depends upon the duration of fuel injection as will become apparent.

Spark plugs 71 are mounted in the cylinder head assemblies 23 and have their spark gaps disposed substantially on the axis of the cylinder bores 19. These spark plugs 71 are fired by an ignition circuit under the control of the ECU 68.

The ECU 68 controls the timing of firing of the spark plugs 71 and the beginning and duration of fuel injection by the injector 69. To this end, there is provided a number of sensors which sense either engine running conditions, ambient conditions or conditions of the outboard motor 11 that will effect engine performance. Certain of the sensors are shown schematically in FIG. 1 and will be described by reference to that figure. It should be readily apparent to those skilled in the art, however, that other types of sensing and control arrangements may be provided operating within the general parameters which will be set forth later having to do with the timing of initiation of fuel injection.

A crank angle sensor 72 is associated with the crankshaft 14. This sensor 72 provides not only a signal of crank angle but by comparing that signal with time an indication of crankshaft rotational speed.

There is also provided a crankcase pressure sensor 73 which senses the pressure in one or all of the crankcase chambers 25. By measuring crankcase pressure at a particular crank angle, engine air induction amount can be determined.

Engine or operator demand is determined by a throttle position sensor 74 that operates in conjunction with a throttle valve 28 so as to determine this function.

The ECU 68 may operate on a feedback control condition and thus, an air fuel ratio sensor 75 is provided that communicates with the combustion chambers or exhaust port of at least one of the cylinder. Preferably, an oxygen sensor is utilized for this purpose, although other types of devices may be employed.

In order to provide a good indication of the fuel/air ratio, it is important that the oxygen sensor 75 is positioned so that it will sense the combustion products near the completion of combustion and before a fresh charge of air is delivered to the combustion chamber. Therefore, and as best shown in FIG. 3, the oxygen sensor 75 is provided so that its probe opens into the cylinder bore 19 at a point that is disposed slightly vertically above the upper edge of the exhaust port 36. In this way, the oxygen sensor 75 will be in a position to receive combustion products immediately before opening of the exhaust port and most positively before the opening of the scavenge ports so that it will sense the combustion products at the time combustion has been substantially completed. However, this places the oxygen sensor 75 in a position where fuel from the fuel injector may reach it and thus its sensitivity may be directly effected. This is compensated for in a manner which will be described later.

Engine temperature is sensed by a engine temperature sensor 76.

The temperature of the cooling water drawn from the body of water in which the watercraft or outboard motor 11 is operated is measured by a water temperature sensor 77. As has been noted, those sensors described may be just typical of any of the wide variety of sensors utilized for engine control.

In addition to controlling timing of firing of the spark plugs 71 and initiation and duration of fuel injection by the fuel injectors 43, the ECU 68 may also control a lubricating system. This is comprised of an oil supply system including a pump 78 that sprays oil into the intake passages 29 for engine lubrication. In addition, some forms of direct lubrication may be also employed for delivering lubricant directly to certain components of the engine.

It has already been noted that the adjustment of the angle of the propeller 17 will change the vertical position of its high-speed exhaust discharge and accordingly the back pressure. Thus, there are provided additional sensors which sense factors that will indicate this depth. These comprise an engine height sensor 79 that is mounted on the outboard motor 11 and which senses its height adjustment. Also, a trim angle sensor 81 is provided which senses the adjusted trim angle.

Other sensors may also be employed for control and some of these are associated with the engine 13 or the outboard motor 11 itself. These may include an engine vibration or knock sensor 82 and a neutral sensor 83. The neutral sensor 83 cooperates with the aforenoted forward, neutral, reverse transmission and will provide an indication of when the watercraft is operating in neutral.

Also shown schematically in FIG. 1 is a watercraft speed sensor 84 and a watercraft pitch sensor 85 that will sense the condition of the watercraft relative to the body of water and again indirectly the back pressure in the exhaust system. Finally, there is provided an atmospheric pressure sensor 86. Of course, the sensors described are only typical of those types of sensors which may be employed for the feedback control system, as fuel become apparent.

The components of the system as thus far described may be considered to be conventional and for that reason, where any component has not been illustrated or described in detail, reference may be had to conventional or known structures with which to practice the invention. The invention deals primarily with the timing of beginning of fuel injection and also the duration of injection particularly during operation in the lean burn or stratified range. This may be understood by first referring to the timing diagram shown in FIG. 5.

Figure 5:
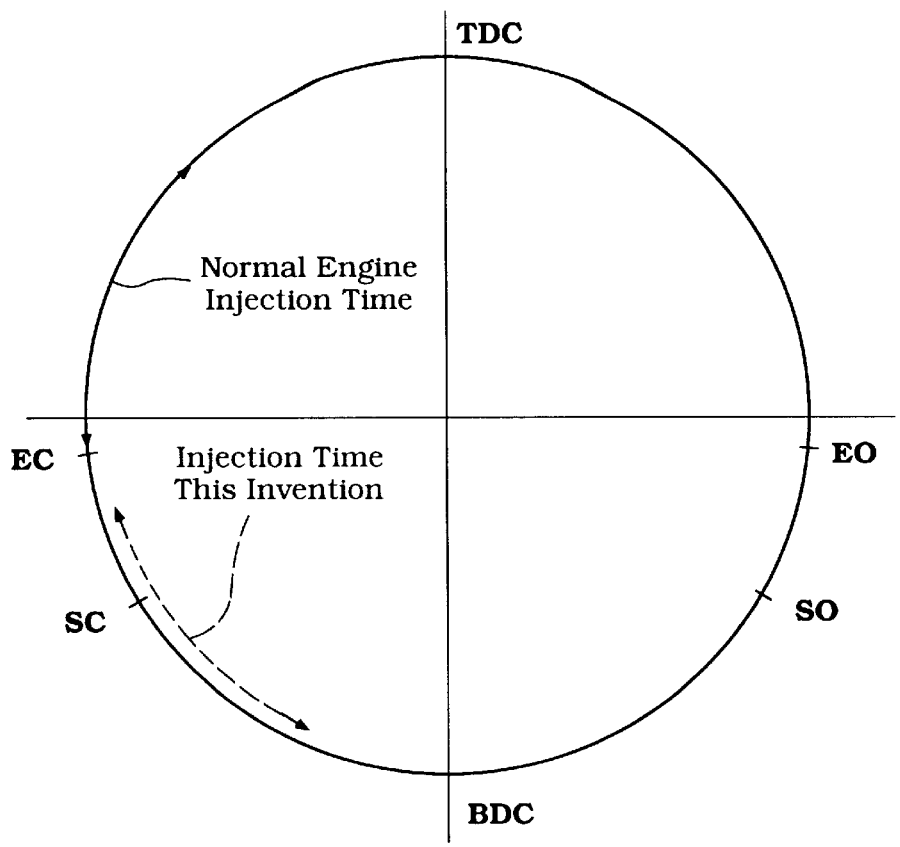
FIG. 5 is a timing diagram showing the fuel injection strategy in accordance with the invention in relation to crank angle and also the prior art type of strategy.
Figure 6:
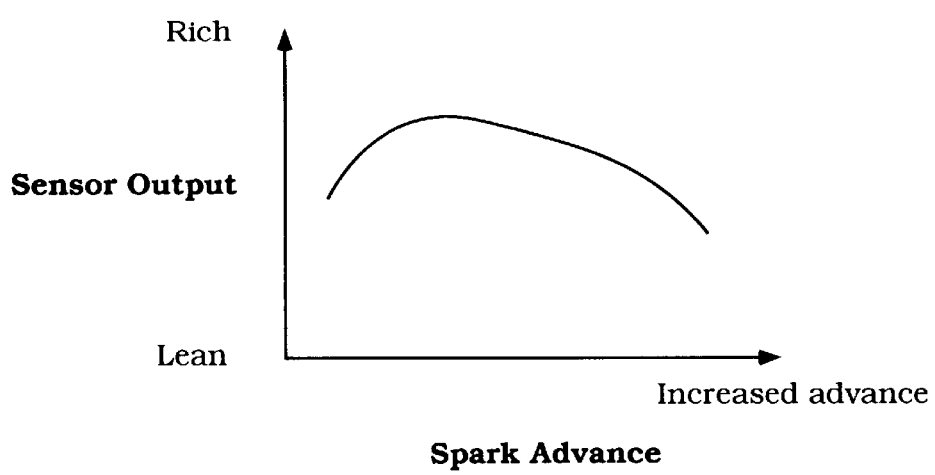
FIG. 6 is a graphical view that shows how the sensor output can vary with the timing of fuel injection if no other changes are made to illustrate the problems that are solved by the invention.

The direction of crankshaft rotation is indicated by the arrow R and the piston top dead center position, as shown in FIG. 5, is indicated at TDC. Bottom dead center position is indicated in FIG. 5 as BDC. This figure also shows the timing of opening of the scavenge and exhaust ports and their respective closing. The opening of the exhaust ports 36 occurs when the piston passes the upper edge of the exhaust port 36. This point is indicated as EO in FIG. 5.

As the pistons 21 continue their downward movement eventually the scavenge ports will open when their upper edges are opened by the downward movement of the pistons 21. This point appears in FIG. 5 as SO.

The scavenging operation continues when the piston 21 passes bottom dead center and begins to move upwardly to begin to close the scavenge ports 33 and 34 by passing their lower edges. Full closure of the scavenge ports occurs at the point SC in FIG. 5 when the piston again passes the upper edge of the scavenge ports 33 and 34.

Finally, the exhaust ports 36 are closed when the pistons 21 pass their upper edges 78 at the point EC.

With conventional engine injection strategies, the fuel injection is begun generally almost immediately after the exhaust ports 36 are closed with the duration being determined by the load on the engine. This is shown in FIG. 5. As may be seen in FIGS. 3 and 4, the scavenge air flow acts so as to take the fuel patch and drive it toward the exhaust port 36. Thus, the conventional practice is to cause the injection to happen late in the cycle before the piston reaches top dead center and immediately before firing. As more fuel is required, the injection duration is extended. However, this may cause the fuel to travel to the exhaust port before combustion has been completed and when the exhaust port again opens some unburned fuel may escape.

Also the velocity of air flow in the combustion chamber at this time is relatively low and there will be poor mixing of fuel with the air. The low air velocity also results in poor flame propagation and poor and/or incomplete combustion results.

In accordance with the invention, the injection timing is initiated before a point where the injected fuel path toward the exhaust port 36 and considering the air flow within the combustion chamber will not reach the exhaust port before it has fully closed. This concept is described in full detail in our aforenoted, copending application. Since this invention relates primarily to control under certain specific running conditions, a full description of the basic control strategy is not believed necessary to understand or practice this invention. However, in accordance with the invention, the fuel injection is initiated at a time after bottom dead center and before exhaust port closing and continuing to a point before the exhaust port closes. The actual time of starting of injection and the duration are controlled by a feedback control and certain portions of that routine will now be described.

Figure 7:
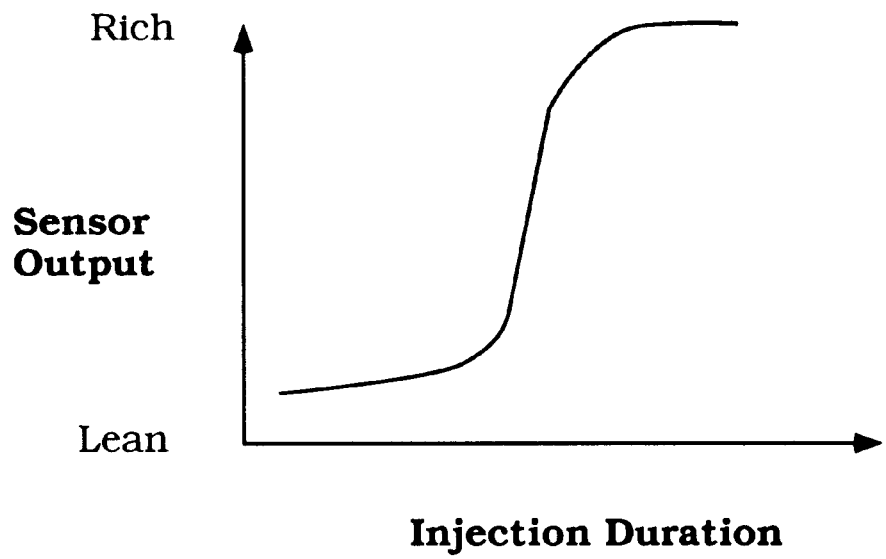
FIG. 7 is a graphical view showing how injection time duration also will effect the sensor output.

As may be seen in FIG. 7, the output of the oxygen sensor 75 varies with the amount of duration of fuel that is injected. When smaller amounts are injected due to a shorter time of injection, then the mixture in the combustion chamber is lean and as the time of injection increases, it becomes richer.

Figure 8:
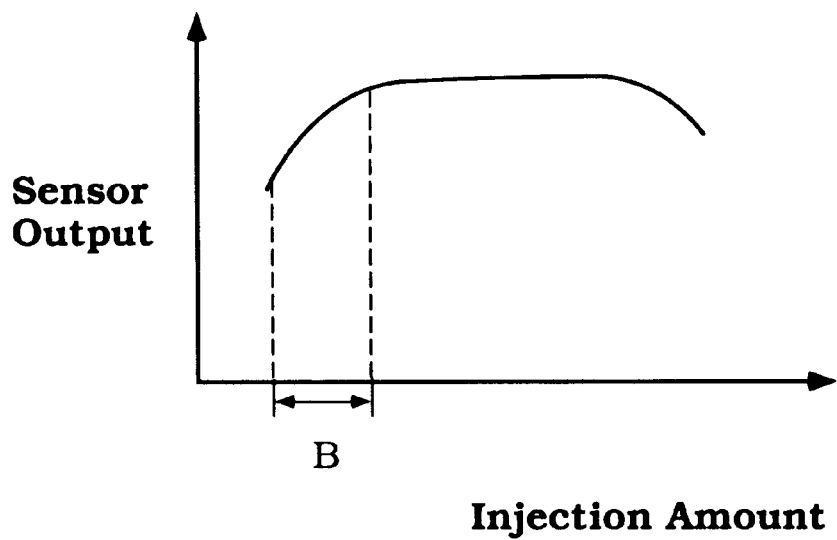
FIG. 8 is a graphical view showing how injection amount effects engine power output and illustrates the portion of the curve on which the preferred system operates.

FIG. 8 is a graphical view showing how the injection amount effects the power output of the engine. It will be seen that during smaller injection amounts the power builds up rather rapidly but then the power output stays fairly constant. Therefore, it is preferable to operate the engine in a lean burn mode by operating in the range indicated at B in this figure. This is one of the important control ranges that the invention deals with. That is, the feedback control during the lean burn range.

Figure 9:
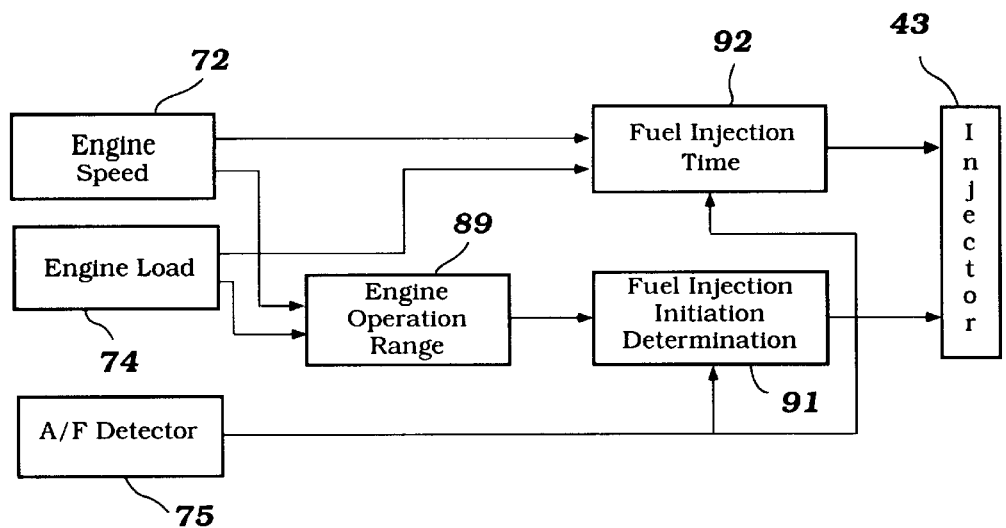
FIG. 9 is a partially schematic view showing the interrelationship between the various components of the control system.

FIG. 9 shows graphically the elements that are involved in the control strategy and how they are interrelated so as to control the timing and duration of fuel injection by the fuel injectors 43. It has been noted that there is a crank angle sensor 72 and this sensor appears to supply a signal indicative of engine speed. Also, there is a throttle position sensor 74 and that sensor gives an indication of engine load.

These signals are transmitted to a section 89 of the ECU that provides a determination as to what the engine operating mode is. The various operating modes will be described shortly with reference to FIG. 10. The engine operating range determination made at the section 89 is transmitted to a section 91 of the ECU which makes a determination of the fuel injection initiation timing.

The engine speed and engine load signals from the sensor 72 and 74 are also transmitted to a further section 92 of the ECU 86 that determines from maps or similar devices the amount of fuel to be injected or the time during which fuel will be injected. The devices 91 and 92 output a control signal to the injector 43 for its control.

In addition and as part of the feedback, there is also provided a signal from the oxygen sensor 75 which is transmitted to both the sections 91 and 92 so as to make corrections in the timing and duration of fuel injection so as to maintain the desired air/fuel ratio.

Figure 10:
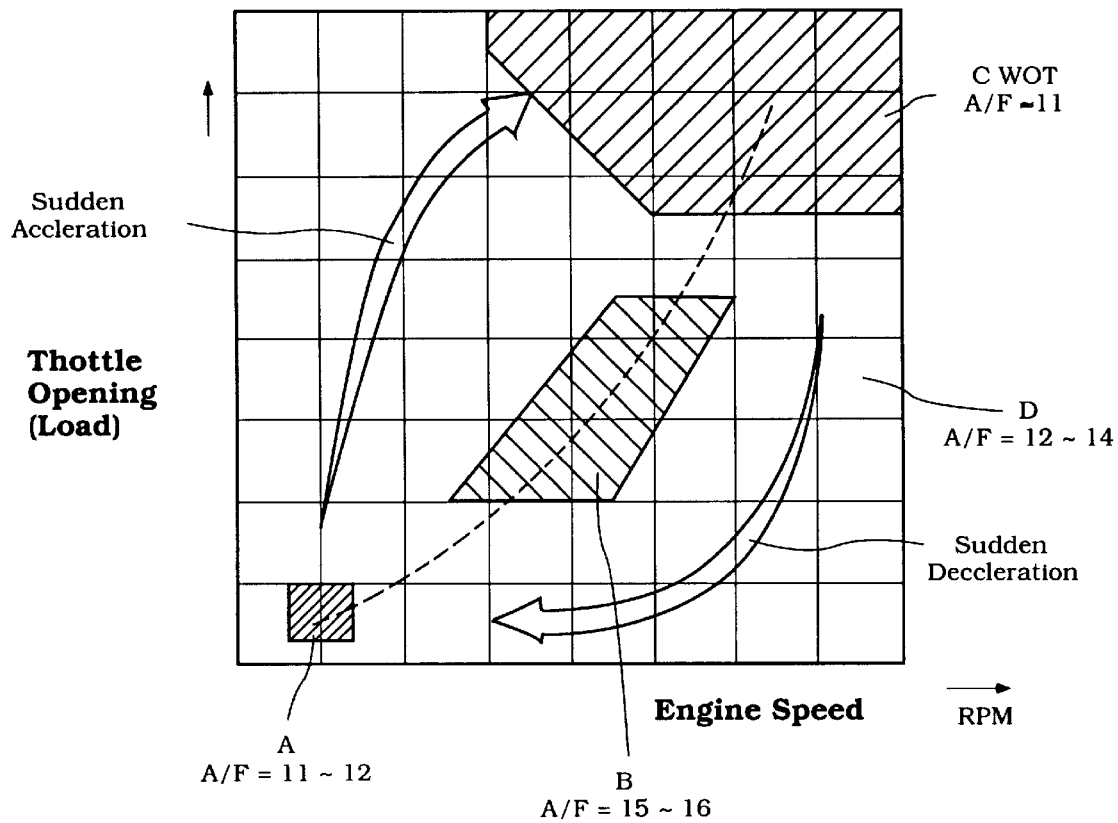
FIG. 10 is a map that shows the different control ranges that are employed in conjunction with the invention.

The various operating ranges are shown in FIG. 10, as aforenoted and will now be described. FIG. 10 is a graphical view showing the determinations that are made in the ECU section 89 to determine the engine operational range. Under light loads and speeds the mixture is kept rich and the air/fuel ratio is set so as to be in the range of about 11 to 12 to 1. This range is indicated by the reference character A.

In midrange conditions there is a control range indicated at B where the engine is operated in a lean burn condition and the mixture may be somewhat stratified. This range is indicated by the reference character B and in this range the air/fuel ratio is maintained in the range of about 15 to 16 to 1.

Under high load/high speed conditions which approaches wide open throttle, there is a third control range indicated at C where the mixture is run on the excessively rich side to protect the engine from damage. In this range, the air to fuel ratio is maintained about 11 to 1.

There is a remaining range outside of those noted which is indicated at D and in this range the mixture is kept on the weak side of rich, i.e., around 12 to 14 to 1.

There are also two other types of conditions which are indicated by the open arrows one of which represents sudden acceleration and the other of which indicates sudden deceleration.

Figure 11:
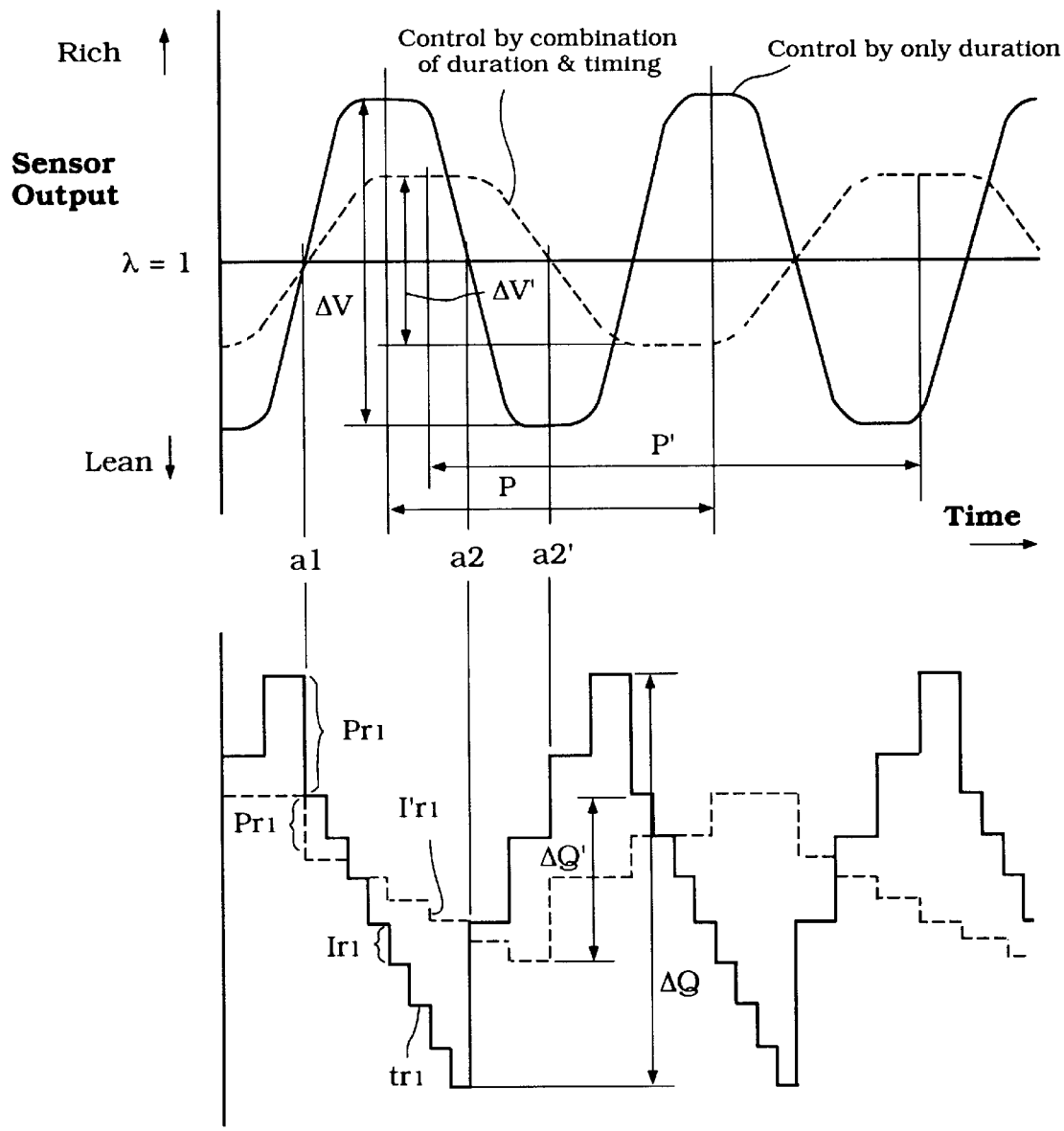
FIG. 11 is a graphical view showing the control strategy in accordance with the invention showing at the top portion of it the sensor output and at the lower portion the adjustments made in injection timing and duration.

The way the mixture is controlled can be understood by reference to FIG. 11. Referring first to the upper portion of this figure, this shows the sensor output in a normal running engine when the control of the fuel injection only controls the fuel injection amount or duration. It will be seen that with this type of control there is a very large amplitude of variation $\Delta V$ between the rich and lean sides and a fairly short period P between the peaks. This will give an uneasy feeling to the operator because it will be clearly evident that the engine conditions are hunting. Also stalling and/or backfiring may result.

However and in accordance with the invention, both the injection timing and duration are controlled with the primary control being based upon injection timing. Under this condition, the amplitude $\Delta V'$ between rich and lean is much lesser while the period P' between peaks is much longer. Hence, the hunting that does exist will not be as discernible to the operator and the operation will appear to be more comfortable. Also stalling and backfiring will be avoided.

The lower portion of this figure shows how the incremental changes are made both with the prior art method and with the invention in this method. Beginning at the point in time a1 when the mixture goes from lean to rich, the conventional system provides a fairly substantial reduction in injection amount indicated at PRL. Then during successive time intervals, the injection duration is gradually decreased until the time a2 when the mixture goes back from rich to lean. Thus, the amplitude of variation in fuel supply $\Delta Q$ is quite large. These variations in injection amount are decreased after the first step to smaller amounts IRL each being made at a time interval TRL.

With the instant invention, however, at the time a1, the injection amount is first increased by an amount P'RL. Subsequently, there are made progressive decreases in fuel injection amount indicated I'RL but also there is a change in the time of injection with the timing being changed in either the advancing or retarding direction depending upon the particular control strategy desired.

Therefore, at the time a2', the mixture will have gone from rich back to the cross over to the lean point at a longer time interval as previously indicated. Also, the amount of fuel injection change $\Delta Q'$ is much less than with the prior art type method. Therefore, the total amount of consumed will also be substantially reduced.

Figure 12:
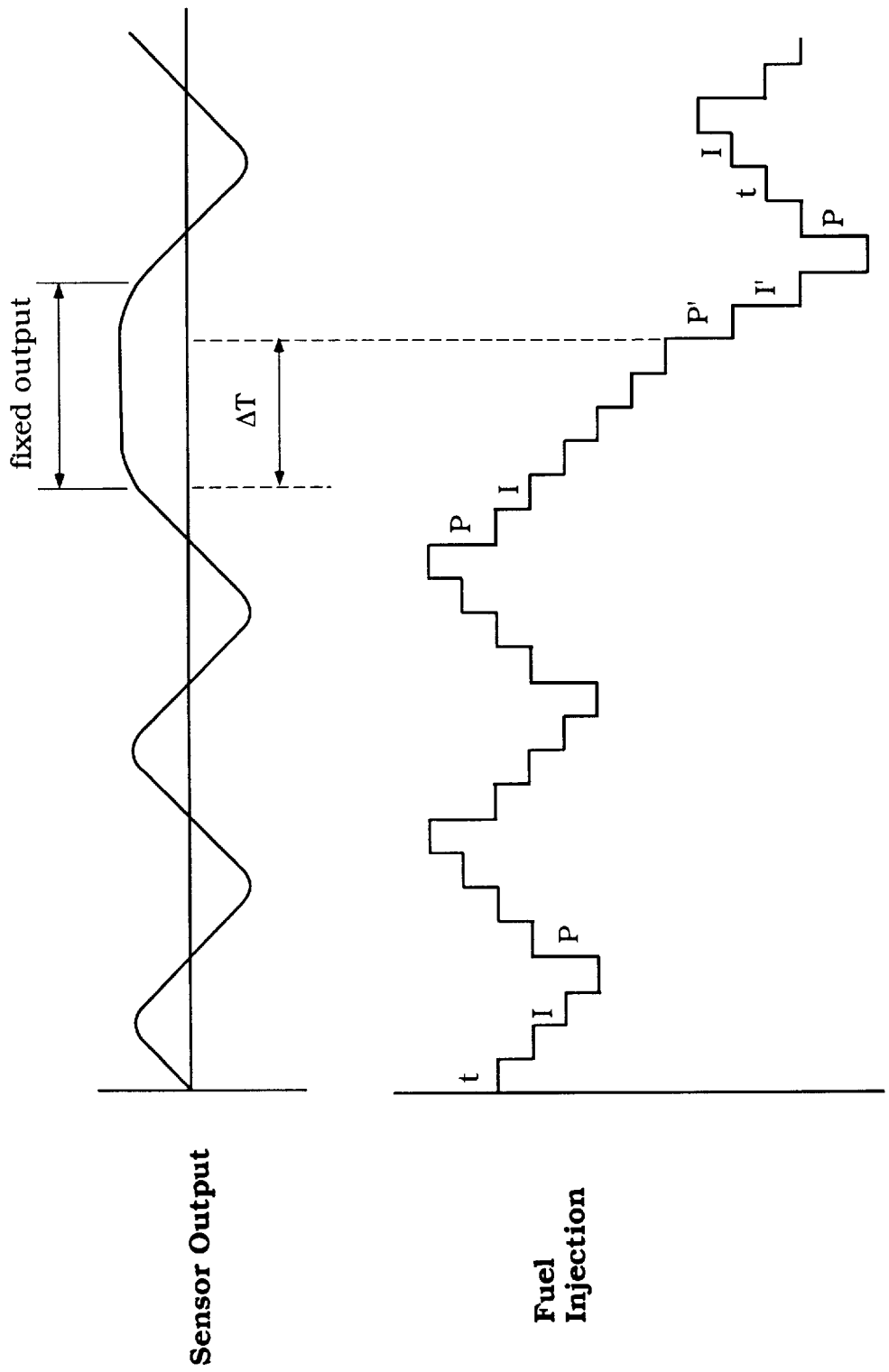
FIG. 12 is a graphical view, in part similar to FIG. 11 and shows another control routine embodiment.

FIG. 12 shows another portion of the control routine that may be employed under a certain condition where there is no substantial change in sensor output. This can occur for a number of reasons and is indicated at the upper portion of the curve and indicates a rich condition in this particular embodiment. When this condition exists for more than a predetermined time indicated at $\Delta T$ then the program moves from a situation where the injection beginning timing is adjusted back to a condition when the injection time or duration is controlled. This is done so as to bring the condition back into stability faster.

The embodiments thus far described are all in connection with a two cycle engine. As mentioned earlier, however, the invention also can be utilized with four-cycle engines and such engine embodiment is shown in FIG. 13. The illustrated embodiment is of a V6 twin overhead cam shaft engine. The overhead cam shaft mechanism appears in this figure and is identified generally by the reference numeral 101. Since the invention can be practiced with any type of conventional four-cycle engine as well as any type of two cycle engine, further description of this embodiment is not believed to be necessary to permit those skilled in the art to practice the invention. Also, since primarily the same parameters are measured, the same sensor arrangements have also been illustrated in this figure. In view of the foregoing description, however, it is believed unnecessary to fully describe this embodiment since it is believed that those skilled in the art will literally understand how the invention can be practice with four-cycle engines as well as two cycle engines.

Thus, from the foregoing description it should be readily apparent that the injection control strategy described is very effective in providing good engine combustion and complete mixing of the fuel with the air and rapid flame propagation so as to avoid the likelihood that fuel will be sent out of the exhaust port and thus avoid the incomplete combustion that results with a prior art type of arrangement. Of course, the foregoing description is that of a preferred embodiment of the invention and various changes and modifications may be made without departing from the spirit and scope of the invention, as defined by the appended claims.

What is claimed is:

1. A direct cylinder injected, internal combustion engine comprised of an engine body defining at least one cylinder bore in which a piston reciprocates, a cylinder head affixed to one end of said engine body for closing said cylinder bore and defining with said piston and said cylinder bore a combustion chamber, at least one intake port for admitting an air charge to said combustion chamber, at least one exhaust port for discharging burned combustion products from said combustion chamber, a fuel injector for spraying fuel directly into said combustion chamber for combustion therein, a combustion condition sensor provided in proximity to said fuel injector for determining the air/fuel ratio in said combustion chamber, and a feedback control system for controlling the initiation of fuel injection and the duration of fuel injection based upon the output from said combustion condition sensor to maintain the desired fuel/air ratio, said feed back control being effective to control the fuel/air ratio in at least one engine running condition primarily by adjusting only one of the timing of beginning of fuel injection and the duration of fuel injection in order to maintain the desired fuel/air ratio.

2. A direct cylinder injected, internal combustion engine as set forth in claim 1 wherein the feed back control shifts to controlling the other of the timing of beginning of fuel injection and the duration of fuel injection under the at least one running condition after an initial change in one of the timing of beginning of fuel injection and the duration of fuel injection in order to maintain the desired fuel/air ratio.

3. A direct cylinder injected, internal combustion engine as set forth in claim 2 wherein the control under the at least one running condition is initially the timing of the beginning of fuel injection.

4. A direct cylinder injected, internal combustion engine as set forth in claim 2 wherein the control under the at least one running condition is initially the duration of the fuel injection.

5. A direct cylinder injected, internal combustion engine as set forth in claim 2 wherein the at least one engine running condition is a lean burn running condition.

6. A direct cylinder injected, internal combustion engine as set forth in claim 5 wherein the lean burn running condition is effected when the engine speed and load is in a mid range.

7. A direct cylinder injected, internal combustion engine as set forth in claim 6 wherein the control under the lean burn running condition is initially the timing of the beginning of fuel injection.

8. A direct cylinder injected, internal combustion engine as set forth in claim 2 wherein the at least one engine running condition is a condition when the output from the combustion condition sensor first shifts between at least one of rich and lean conditions.

9. A direct cylinder injected, internal combustion engine as set forth in claim 8 wherein the control under the running condition when the output from the combustion condition sensor first shifts is initially the duration of the fuel injection.

10. A direct cylinder injected, internal combustion engine as set forth in claim 8 wherein the at least one engine running condition is a condition when the output from the combustion condition sensor first shifts between both of the rich and lean conditions.

11. A direct cylinder injected, internal combustion engine as set forth in claim 10 wherein the control under the running condition when the output from the combustion condition sensor first shifts is initially the duration of the fuel injection.

12. A direct cylinder injected, internal combustion engine as set forth in claim 2 wherein the at least one engine running condition is a condition when the output from the combustion condition sensor is fixed for more than a predetermined time.

13. A direct cylinder injected, internal combustion engine as set forth in claim 12 wherein the control is shifted to injection duration control if the output from the combustion condition sensor is fixed for more than the predetermined time.

14. A direct cylinder injected, internal combustion engine as set forth in claim 2 wherein the engine operates on a two cycle crankcase compression principle.

15. A direct cylinder injected, internal combustion engine as set forth in claim 14 wherein the engine powers a marine propulsion device.

16. A direct cylinder injected, internal combustion engine as set forth in claim 15 wherein the engine exhaust port delivers the exhaust gasses to the atmosphere through the body of water in which the marine propulsion device operates under at least some running conditions.

17. A direct cylinder injected, internal combustion engine as set forth in claim 2 wherein the engine operates on a four cycle principle.

18. A direct cylinder injected, internal combustion engine as set forth in claim 17 wherein the engine powers a marine propulsion device.

19. A direct cylinder injected, internal combustion engine as set forth in claim 18 wherein the engine exhaust port delivers the exhaust gasses to the atmosphere through the body of water in which the marine propulsion device operates under at least some running conditions.

20. A method of operating a direct cylinder injected, internal combustion engine comprised of an engine body defining at least one cylinder bore in which a piston reciprocates, a cylinder head affixed to one end of said engine body for closing said cylinder bore and defining with said piston and said cylinder bore a combustion chamber, at least one intake port for admitting an air charge to said combustion chamber, at least one exhaust port for discharging burned combustion products from said combustion chamber, a fuel injector for spraying fuel directly into said combustion chamber for combustion therein, said method comprising the steps of determining the air/fuel ratio in said combustion chamber, and controlling the initiation of fuel injection and the duration of fuel injection based upon the sensed fuel air ratio to maintain the desired fuel/air ratio, said control of the fuel/air ratio in at least one engine running condition being primarily by adjusting only one of the timing of beginning of fuel injection and the duration of fuel injection in order to maintain the desired fuel/air ratio.

21. A method of operating a direct cylinder injected, internal combustion engine as set forth in claim 20 wherein the feed back control shifts to controlling the other of the timing of beginning of fuel injection and the duration of fuel injection under the at least one running condition after an initial change in one of the timing of beginning of fuel injection and the duration of fuel injection in order to maintain the desired fuel/air ratio.

22. A method of operating a direct cylinder injected, internal combustion engine as set forth in claim 21 wherein the control under the at least one running condition is initially the timing of the beginning of fuel injection.

23. A method of operating a direct cylinder injected, internal combustion engine as set forth in claim 21 wherein the control under the at least one running condition is initially the duration of the fuel injection.

24. A method of operating a direct cylinder injected, internal combustion engine as set forth in claim 21 wherein the at least one engine running condition is a lean burn running condition.

25. A method of operating a direct cylinder injected, internal combustion engine as set forth in claim 24 wherein the lean burn running condition is effected when the engine speed and load is in a mid range.

26. A method of operating a direct cylinder injected, internal combustion engine as set forth in claim 25 wherein the control under the lean burn running condition is initially the timing of the beginning of fuel injection.

27. A method of operating a direct cylinder injected, internal combustion engine as set forth in claim 21 wherein the at least one engine running condition is a condition when the output from the combustion condition sensor first shifts between at least one of rich and lean conditions.

28. A method of operating a direct cylinder injected, internal combustion engine as set forth in claim 27 wherein the control under the running condition when the output from the combustion condition sensor first shifts is initially the duration of the fuel injection.

29. A method of operating a direct cylinder injected, internal combustion engine as set forth in claim 27 wherein the at least one engine running condition is a condition when the output from the combustion condition sensor first shifts between both of the rich and lean conditions.

30. A method of operating a direct cylinder injected, internal combustion engine as set forth in claim 29 wherein the control under the running condition when the output from the combustion condition sensor first shifts is initially the duration of the fuel injection.

31. A method of operating a direct cylinder injected, internal combustion engine as set forth in claim 21 wherein the at least one engine running condition is a condition when the output from the combustion condition sensor is fixed for more than a predetermined time.

32. A method of operating a direct cylinder injected, internal combustion engine as set forth in claim 31 wherein the control is shifted to injection duration control if the output from the combustion condition sensor is fixed for more than the predetermined time.

33. A method of operating a direct cylinder injected, internal combustion engine as set forth in claim 21 wherein the engine operates on a two cycle crankcase compression principle.

34. A method of operating a direct cylinder injected, internal combustion engine as set forth in claim 33 wherein the engine powers a marine propulsion device.

35. A method of operating a direct cylinder injected, internal combustion engine as set forth in claim 34 wherein the engine exhaust port delivers the exhaust gasses to the atmosphere through the body of water in which the marine propulsion device operates under at least some running conditions.

36. A method of operating a direct cylinder injected, internal combustion engine as set forth in claim 21 wherein the engine operates on a four cycle principle.

37. A method of operating a direct cylinder injected, internal combustion engine as set forth in claim 36 wherein the engine powers a marine propulsion device.

38. A method of operating a direct cylinder injected, internal combustion engine as set forth in claim 37 wherein the engine exhaust port delivers the exhaust gasses to the atmosphere through the body of water in which the marine propulsion device operates under at least some running conditions.

* * * * *